United States Patent Office 3,428,644
Patented Feb. 18, 1969

3,428,644
PREPARATION OF HOMO- AND HETEROARYL-2-ANILINE KETONES
Paul Aeberli, Madison, and William J. Houlihan, Mountain Lakes, N.J., assignors to Sandoz Inc., Hanover, N.J.
No Drawing. Filed June 28, 1965, Ser. No. 467,690
U.S. Cl. 260—296                   8 Claims
Int. Cl. C07d 31/42, 27/20, 63/10

ABSTRACT OF THE DISCLOSURE

Homo- and heteroaryl-2-aniline ketones (I) useful as intermediates for pharmaceuticals, are prepared by contacting a 3-homo- or heteroaryl- oxindole with a base to form a salt which is then reacted with oxygen to form I.

The present invention is directed to the preparation of intermediates for pharmaceuticals. The intermediates are compounds of the formula

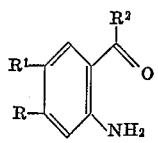

(I)

wherein
R is either a chlorine atom (—Cl); a hydrogen atom (—H); hydroxyl (—OH); lower alkyl having no α-branching, e.g. methyl, ethyl, propyl and butyl; lower alkoxy having no α-branching, e.g. methoxy, ethoxy, propoxy and butoxy; or, together with $R^1$, methylenedioxy (—O—CH$_2$—O—);
$R^1$ is either a chlorine atom (—Cl); a hydrogen atom (—H); hydroxyl (—OH); lower alkyl having no α-branching, e.g. methyl, ethyl, propyl and butyl; lower alkoxy having no α-branching, e.g. methoxy, ethoxy, propoxy and butoxy; or, taken together with R, methylenedioxy (—O—CH$_2$—O—);
$R^2$ is either 2-furyl, 3-furyl, 2-thienyl, 3-thienyl, 2-pyridyl, 3-pyridyl, 4-pyridyl, 1-naphthyl, 2-naphthyl

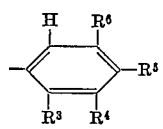

or
each of $R^3$, $R^4$, $R^5$ and $R^6$ is either a hydrogen atom (—H); a chlorine atom (—Cl); a fluorine atom (—F); lower alkyl with no α-branching, e.g. methyl, ethyl, propyl and butyl; lower alkoxy with no α-branching, e.g. methoxy, ethoxy, propoxy and butoxy; nitro (—NO$_2$); trifluoromethyl (—CF$_3$); phenyl; or —SO$_2$R′; with the proviso that a plurality of trifluoromethyl, phenyl, nitro and —SO$_2$R′ groups are not bound to adjacent carbon atoms; and
R′ is either lower alkyl having no α-branching, e.g. methyl, ethyl, propyl and butyl; or phenyl.

These intermediates are useful in the preparation of, e.g., benzodiazepines, such as 7-chloro-2-methylamino-5-phenyl-3H-1,4-benzodiazepine-4-oxide hydrochloride and benzodiazepine derivatives disclosed in Belgian Patent 615,194, which are known and of known pharmacological utility. They are useful, also, in preparing related compounds of the same general class and in investigating changes in pharmacological effects brought about by corresponding changes in structure.

It is an object of this invention to prepare compounds I from materials which are readily available or readily prepared from available compounds. It is a further object of this invention to prepare polysubstituted systems of Formula I. A still further object of this invention is to prepare compounds of Formula I wherein $R^2$ is a phenyl group containing strongly electronegative substituents, e.g. —NO$_2$, —SO$_2$R′ and —CF$_3$. These and other objectives are satisfied by the process of this invention.

The instant process is represented by the following reaction scheme:

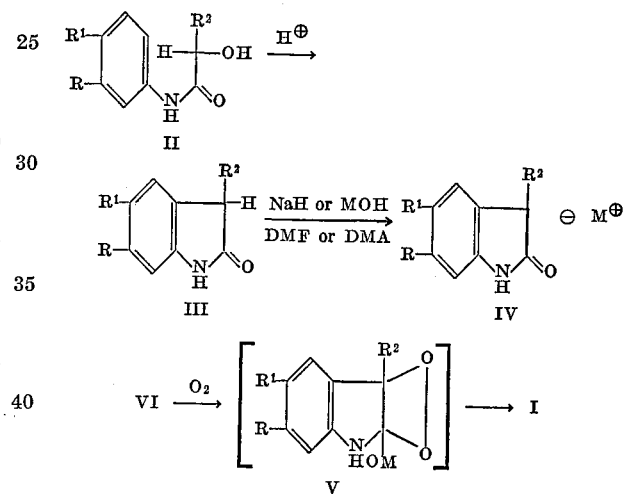

wherein each of R, $R^1$ and $R^2$ has its above-ascribed meaning; and
M is either a lithium ion (Li+), a sodium ion (Na+) or a potassium ion (K+).

Compounds III are prepared from corresponding compounds II according to the procedures described in U.S. Patent 2,759,935. Compounds II are either known or are prepared by known procedures from available compounds.

Compound I is prepared from the corresponding compound III in a solvent, e.g. dimethylformamide (DMF), dimethylacetamide (DMA) and a polar inert solvent, such as ethanol. The preferred temperature range is from 20° to 75° C. Either air or oxygen (O$_2$) is employed as the oxygen source.

The following examples illustrate the invention, all temperatures being in degrees centigrade, parts and percentages being by weight unless otherwise specified, the relationship between parts by weight and parts by volume being the same as that between the kilogram and the liter.

Example 1.—2-aminobenzophenone

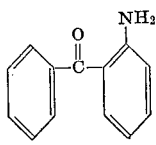

Charge a flask (equipped with a stirrer, condenser, gas inlet and drying tube) with 2.5 parts (0.012 mole) of 3-phenyloxindole, 1.5 parts (0.03 mole) of sodium hydride (50% dispersion in mineral oil) and 125 parts by volume of absolute DMF. Stir the thus-obtained mixture at room temperature (20°) while bubbling dry air below the surface of said mixture. Discontinue the gassing after 16 hours, and admix the thus-gassed material (a dark reddish brown mixture) with ice water.

Filter the resultant semi-solid, wash same with water and then dissolve same in chloroform. Wash the chloroform extract with 2 N hydrochloric acid and saturated (aq) sodium chloride. Dry the thus-washed material over sodium sulfate and concentrate the resultant to obtain 1.4 parts of title compound, melting point (M.P.) 97° to 100°.

Replacing the 3-phenyloxindole with an equivalent of either 3-(2-furyl)oxindole, 3-(3-thienyl)oxindole, 3-(4-pyridyl)oxindole or 3-(1-naphthyl)oxindole results in the preparation, in similar manner, of the corresponding compound I.

Example 2.—2-amino-5-chlorobenzophenone

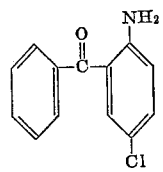

Charge a flask (equipped with a magnetic stirring bar, thermometer, drying tube and a gas inlet tube) with 2.5 parts (0.01 mole) of 5-chloro-3-phenyloxindole, 0.5 part (0.012 mole) of sodium hydroxide and 125 parts by volume of absolute DMF. Stir the resulting mixture, heat same to 50° and pass a stream of dry air through the thus-heated mixture for 15 hours. Then pour the obtained reddish-brown mixture onto 300 parts by volume of ice water and adjust the pH to 2.0. Filter the thus-obtained solid, wash same with water and then dissolve same in chloroform. Wash the resulting chloroform solution with saturated (aq) sodium chloride. Dry the thus-washed solution over sodium sulfate, filter and concentrate in vacuo on a rotary evaporator. Distil the resultant residue under a high vacuum to obtain 1.5 parts of title compound, M.P. 88° to 90°.

Replacing the 5-chloro-3-phenyloxindole with an equivalent of either 3-(3-furyl)-5-hydroxyoxindole, 5,6-dimethyl-3-(2-thienyl)-oxindole, 6-methoxy-3-(2-pyridyl)oxindole, 5,6-methylenedioxy-3-(3-pyridyl)oxindole or 6-chloro-3-(2-naphthyl)oxindole results in the preparation, in similar manner, of the corresponding compound I.

Example 3.—5-methoxy-2-aminobenzophenone

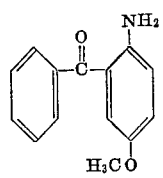

Charge a flask (equipped with a magnetic stirring bar, thermometer, drying tube and a gas inlet tube) with 1.5 parts (0.006 mole) of 5-methoxy-3-phenyloxindole, 0.3 part (0.008 mole) of sodium hydroxide and 75 parts by volume of absolute DMF. Stir the resulting mixture, heat same to 50° and pass a stream of dry air through the thus-heated mixture for 15 hours. Then pour the obtained reddish-brown mixture onto 300 parts by volume of ice water and adjust the pH to 2.0. Filter the thus-obtained solid, wash same with water and then dissolve same in chloroform. Wash the resulting chloroform solution with saturated (aq) sodium chloride. Dry the thus-washed solution over sodium sulfate, filter and concentrate in vacuo on a rotary evaporator. Distil the resultant residue under a high vacuum to obtain 1.5 parts of title compound, M.P. 67° to 69°.

Replacing the 5-methoxy-3-phenyloxindole with an equivalent of either 5-ethyl-3-(2-chloro-4-ethyl)phenyloxindole, 6-ethyl-3-(3-fluoro-4-phenyl)phenyloxindole, 5-ethoxy-3(2,4-dimethyl)-phenyloxindole, 6-ethoxy-3-(3,5-dimethoxy)phenyloxindole, 6-hydroxy-3-(4-ethylsulfonyl-2-nitro)phenyloxindole, 3 - (3-phenyl-5-trifluoromethyl)phenyl-5-propyloxindole, 6-methyl-3-(3,5-dimethylsulfonyl)phenyloxindole or 5-methyl-3-(4-ethoxy-2-phenylsulfonyl)phenyloxindole results in the preparation, in similar manner, of the corresponding compound I.

The invention and its advantages are readily apparent from the foregoing description. Various changes may be made in the starting materials and the process variables without departing from the spirit and the scope of the invention or sacrificing its material advantages. The embodiments hereinbefore set forth are merely illustrative.

What is claimed is:
1. A process for the preparation of a compound of the formula

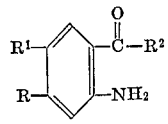

wherein each of R and $R^1$ is, independently, a member selected from the group consisting of a hydrogen atom, hydroxy, a chlorine atom, lower alkyl having no α-branching, and lower alkoxy having no α-branching, and taken together, methylenedioxy; and $R^2$ is a member selected from the group consisting of furyl, thienyl, pyridyl, 1- or 2-naphthyl and a function of the formula

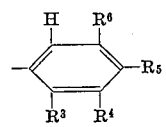

wherein each of $R^3$, $R^4$, $R^5$ and $R^6$, is, independently, a member selected from the group consisting of a hydrogen atom, a halogen atom having an atomic weight of from 19 to 36, lower alkyl having no α-branching, lower alkoxy having no α-branching, nitro, trifluoromethyl, phenyl and —$SO_2R'$; with the proviso that a plurality of trifluoromethyl, phenyl, nitro and —$SO_2R'$ groups are not bound to adjacent carbon atoms; not more than two of $R^3$, $R^4$, $R^5$, and $R^6$ being other than hydrogen; and $R'$ is a member selected from the group consisting of lower alkyl having no α-branching and phenyl which comprises reacting a compound of the formula

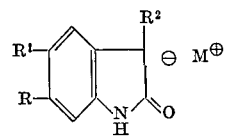

wherein
R, $R^1$ and $R^2$ are as defined above, and
M is a member selected from the group consisting of a lithium ion, a sodium ion and a potassium ion, in a solvent, with oxygen at from 20° to 75° C.

2. A process according to claim 1 wherein M is a sodium ion.

3. A process according to claim 1 wherein $R^2$ is

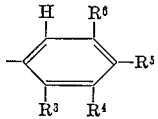

4. A process according to claim 3 wherein each of R, $R^1$, $R^3$, $R^4$, $R^5$ and $R^6$ is a hydrogen atom.

5. A process according to claim 3 wherein each of R, $R^3$, $R^4$, $R^5$ and $R^6$ is a hydrogen atom and $R^1$ is a chlorine atom.

6. A process according to claim 2 wherein each of R, $R^3$, $R^4$, $R^5$ and $R^6$ is a hydrogen atom and $R^1$ is methoxy.

7. A process according to claim 1 wherein $R^2$ is thienyl.

8. A process according to claim 1 wherein $R^2$ is pyridyl.

References Cited

UNITED STATES PATENTS 2,759,935  8/1956  Speeter _____ 260—247.2
3,297,755  1/1967  Sternbach et al. _____ 260—591

HENRY R. JILES, *Primary Examiner.*

A. L. ROTMAN, *Assistant Examiner.*

U.S. Cl. X.R.

260—325, 332.3, 340.5, 347.7, 575, 591